(12) United States Patent
Kim

(10) Patent No.: US 6,577,117 B2
(45) Date of Patent: Jun. 10, 2003

(54) ROTATION SENSING DEVICE OF FAN APPARATUS ADAPTED TO CHAMBER OF HANDLER

(75) Inventor: Dong June Kim, Kyungki-do (KR)

(73) Assignee: Mirae Corporation, Ichon-shi (KR)

( * ) Notice: Subject to any disclaimer, the term of this patent is extended or adjusted under 35 U.S.C. 154(b) by 0 days.

(21) Appl. No.: 10/058,355

(22) Filed: Jan. 30, 2002

(65) Prior Publication Data

US 2002/0186006 A1 Dec. 12, 2002

(30) Foreign Application Priority Data

Jun. 12, 2001 (KR) .......................... 2001-32971

(51) Int. Cl.[7] .................................................. G01P 3/36
(52) U.S. Cl. ....................................................... 324/175
(58) Field of Search ........................ 324/207.11–207.26, 324/244.1, 166, 175, 178; 361/239; 340/635; 415/118; 702/142, 145, 150; 250/231.13–231.18, 233

(56) References Cited

U.S. PATENT DOCUMENTS 4,337,497 A  * 6/1982 Dalle Carbonare ......... 361/239
4,479,115 A  * 10/1984 Holzhauer .................. 340/611
5,767,690 A    6/1998 Fujimoto ..................... 324/760

FOREIGN PATENT DOCUMENTS

GB      2223318 A  * 4/1990  ............ G01M/7/00

OTHER PUBLICATIONS

Seo, J P, Test handler of semiconductor device having apparatus for sensing fan speed, Derwent 2002–605269.*

* cited by examiner

Primary Examiner—Jay Patidar
(74) Attorney, Agent, or Firm—Fleshner & Kim, LLP

(57) ABSTRACT

The present invention relates to a rotation sensing device of a fan apparatus adapted to a chamber in a handler which can sense whether the fan apparatus is rotated or not by using a sensor dog and an optical sensor. The rotation sensing device includes: a sensor dog being installed at the outer circumferential surface of a shaft installed inside a case and being configured to be spread a predetermined length larger than the diameter of the stop state when a centrifugal force is generated by the rotation of the shaft; an optical sensor receiving light reflected from the surface of the sensor dog and producing a sensing signal of the light if the sensor dog is spread the predetermined length by scanning the light to the sensor dog; and a main controller judging that the fan apparatus is rotated upon receipt of the sensing signal of the light from the optical sensor.

5 Claims, 9 Drawing Sheets

ROTATION SENSING DEVICE OF FAN APPARATUS ADAPTED TO CHAMBER OF HANDLER

BACKGROUND OF THE INVENTION

1. Field of the Invention

The present invention relates to a rotation sensing device of a fan apparatus adapted to a chamber of a handler, and more particularly, to a rotation sensing device which can sense a rotational state of a fan apparatus for controlling the temperature of a chamber in a handler regardless of the ambient temperature of the fan apparatus.

2. Description of the Related Art

A handler is used for testing electrical properties of a semiconductor parts. The handler is constructed in such a manner that an elevator/tray transfer, an X-Y robot, an exchanger, and a chamber are installed on a base frame. The tray on which semiconductor parts are loaded are moved to the elevator/tray transfer, and then the semiconductor parts loaded on the tray are moved to an aligner by the X-Y robot. The semiconductor parts moved to the aligner are displaced to a test tray by the exchanger and thereafter are moved to the chamber to be tested.

The chamber includes a preheater, a test site and a defroster. The preheater preheats the semiconductor parts loaded on the test tray, and the test site tests the electric properties of the semiconductor parts loaded on the test tray which have passed through the preheater in a high temperature and low temperature state. When the testing of the semiconductor parts is finished at the test site, the tested test tray is moved to the defroster and then is discharged after the defroster makes the temperature of the semiconductor parts an ambient temperature.

To test the electric properties of the semiconductor parts at the chamber, as described above, a fan apparatus is provided inside the chamber in order to control the internal temperature of the chamber. The construction of the fan apparatus will now be described with reference to FIG. 1.

FIG. 1 is a perspective view of a fan apparatus adapted to a chamber of a handler according to the conventional art. As illustrated therein, the fan apparatus includes a rotary motor 1, a coupling 2, a shaft 3, a case 4 and a plurality of bearing housings 5.

The rotary motor 1 is installed outside the chamber (not shown), and the shaft 3 is connected to a rotary central axis 1a of the rotary motor 1 installed inside the chamber by using the coupling 2. The shaft 3 is installed inside the case 4, and grease is filled inside the case 4 in a state that the bearing housing is installed at both ends of the case 4.

To sense whether the fan apparatus used for control the internal temperature of the chamber by rotating the shaft 3 is rotated or not, as shown in FIG. 1, a thermocouple 8 is used at the cylindrical surface of the fan apparatus according to the conventional art. The thermocouple 8 provides a temperature source to a main controller 100 by sensing the internal temperature of the chamber and transferring it to the main controller 100 of the handler, so that the main controller 100 can check the rotational state of the fan apparatus. Thus, the main controller 100 can control the internal temperature of the chamber by using the temperature source provided from the thermocouple 8, and can sense whether the fan apparatus is rotated or not by using the temperature source in a case that the fan apparatus is not rotated due to the breakage of the coupling 2 and the like of the fan apparatus.

In case of sensing whether the fan apparatus is rotate or not by using the thermocouple according to the conventional art, it is not discriminated whether the fan apparatus is normally rotated or not if the thermo couple is wrongly operated or is not operated, thus making it impossible to control the internal temperature of the chamber.

SUMMARY OF THE INVENTION

It is, therefore, an object of the present invention to provide a rotation sensing device which can sense whether the fan apparatus for controlling the temperature of the chamber of a handler is rotated or not by sensing a rotation state of a sensor dog installed to a shaft of the fan.

It is another object of the present invention to sense directly whether the fan apparatus is rotated or not regardless of the ambient temperature of the fan apparatus by sensing the rotation state of the sensor dog installed to the shaft of the fan.

To achieve the above object, there is provided a rotation sensing device of a fan apparatus adapted to a chamber of a handler comprising: a sensor dog being installed at the outer circumferential surface of a shaft installed inside a case and being configured to be spread a predetermined length larger than the diameter of the stop state when a centrifugal force is generated by the rotation of the shaft; an optical sensor receiving light reflected from the surface of the sensor dog and producing a sensing signal of the light if the sensor dog is spread the predetermined length by scanning the light to the sensor dog; and a main controller judging that the fan apparatus is rotated upon receipt of the sensing signal of the light from the optical sensor.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will now be described with reference to the accompanying drawings.

Figure 1:
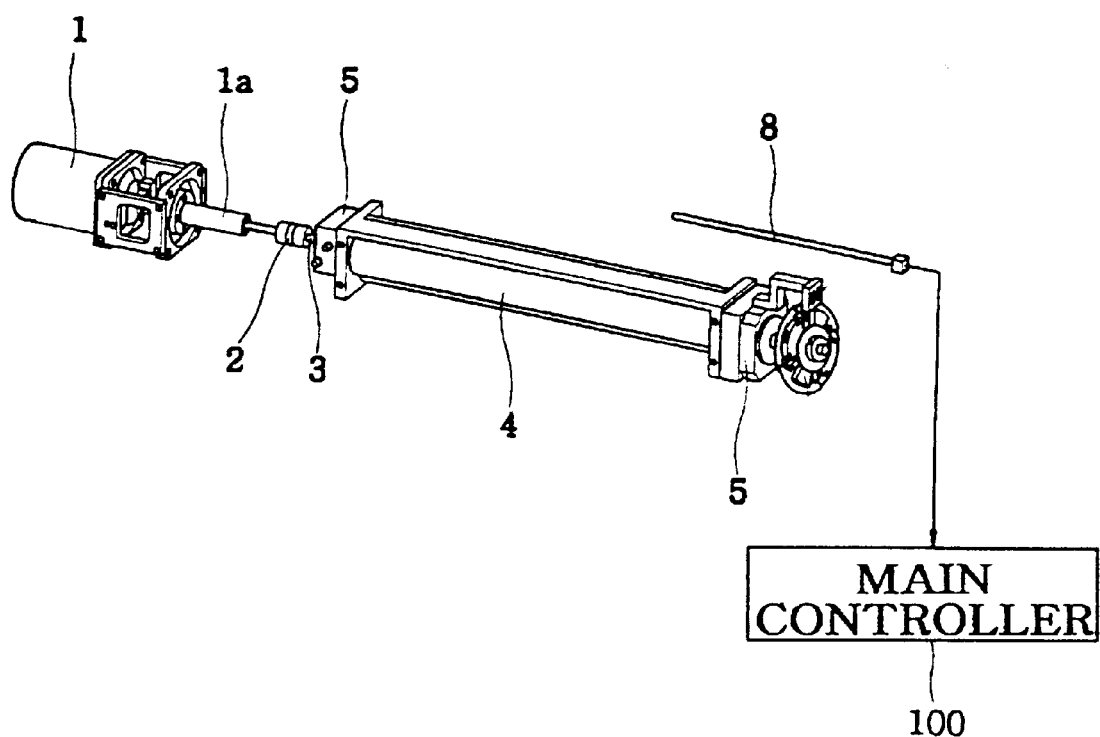
FIG. 1 is a perspective view of a fan apparatus adapted to a chamber of a handler according to the conventional art.
Figure 2:
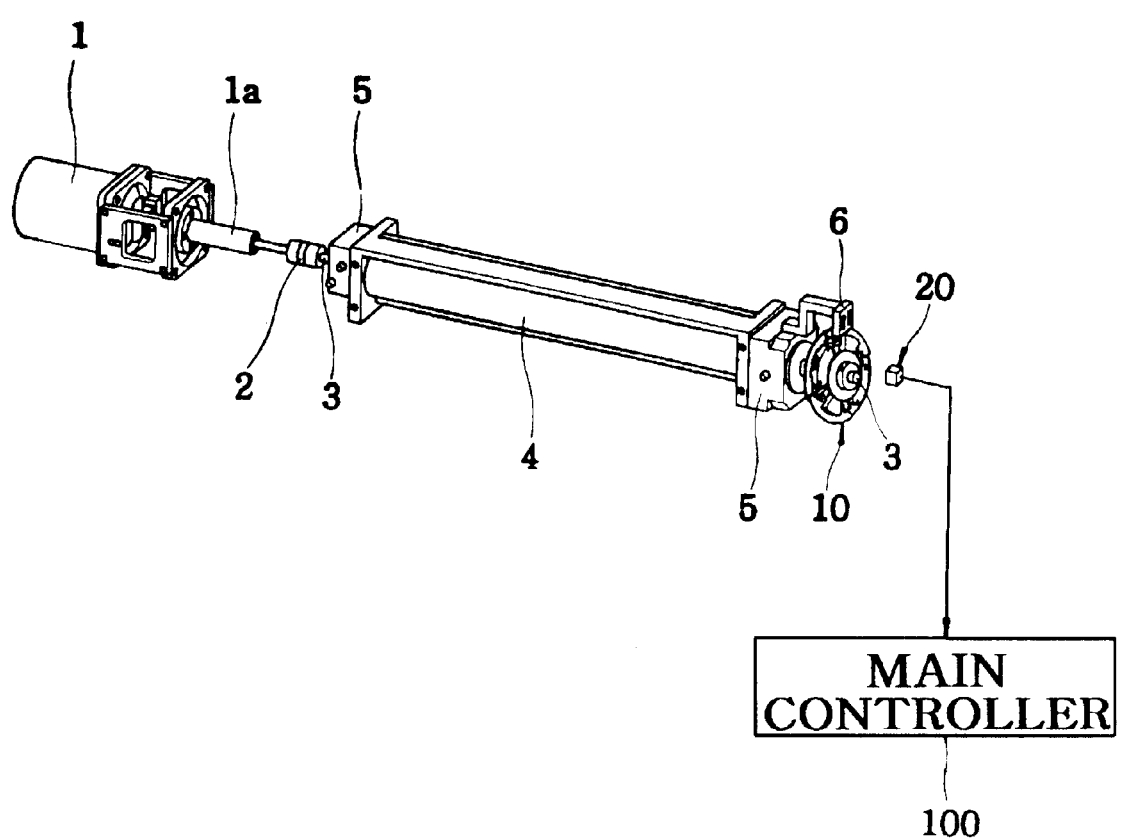
FIG. 2 is a perspective view of a fan apparatus adapted to a chamber according to the present invention.
Figure 3:
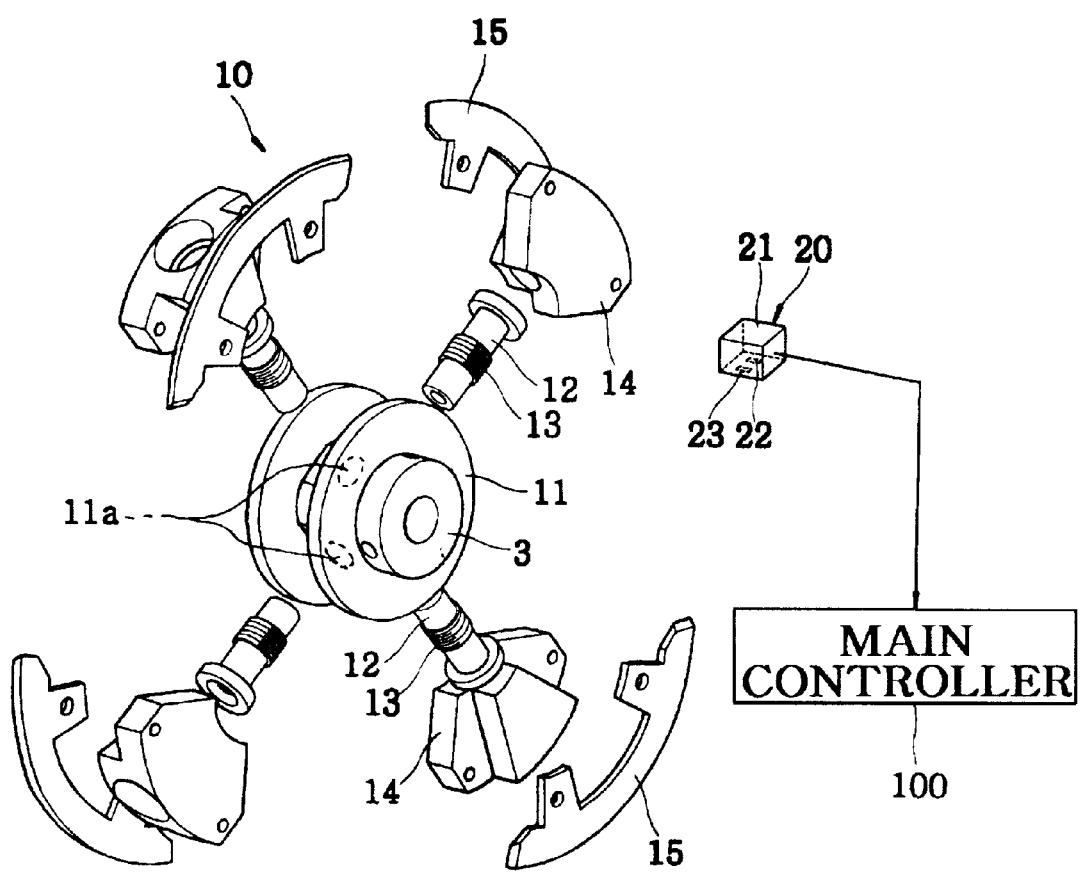
FIG. 3 is an exploded perspective view of a rotation sensing device as shown in FIG. 2.
Figure 4:
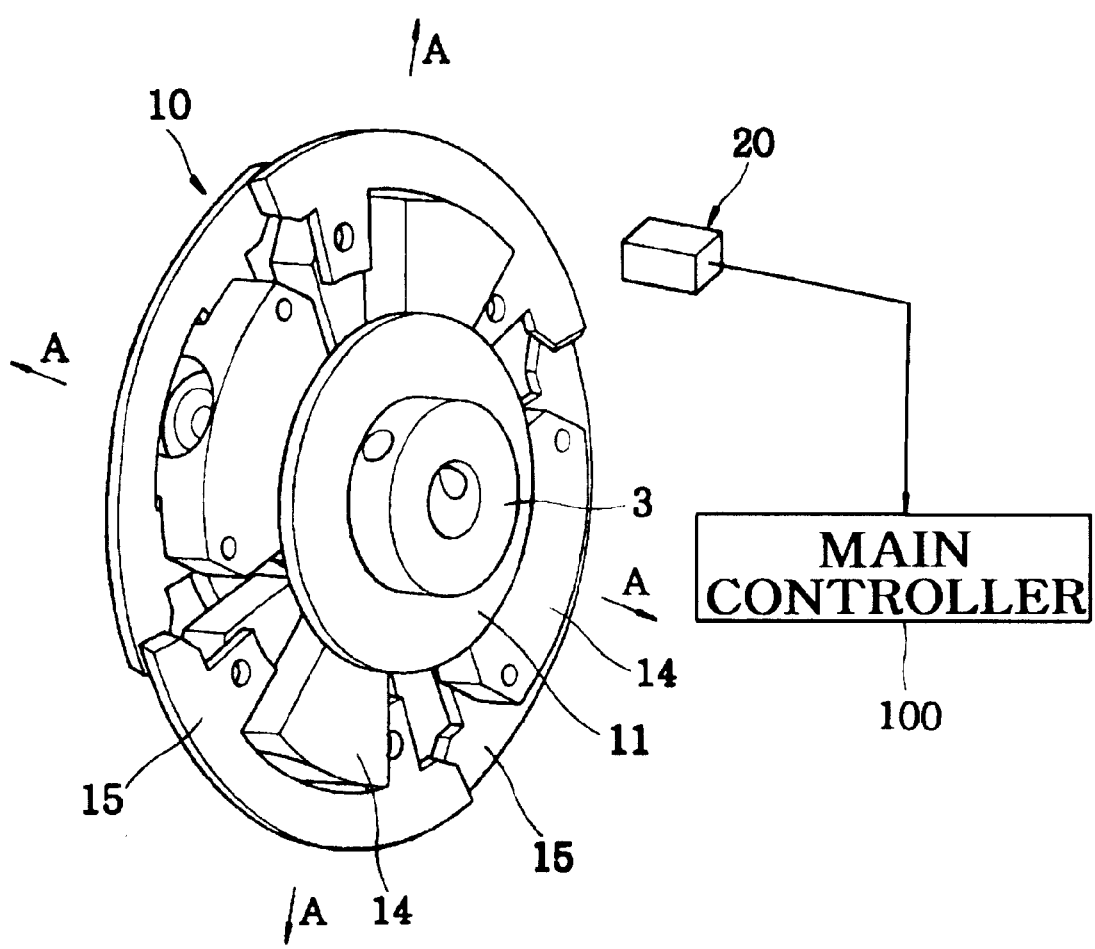
FIG. 4 is an assembly view of the rotation sensing device as shown in FIG. 2.
Figure 5:
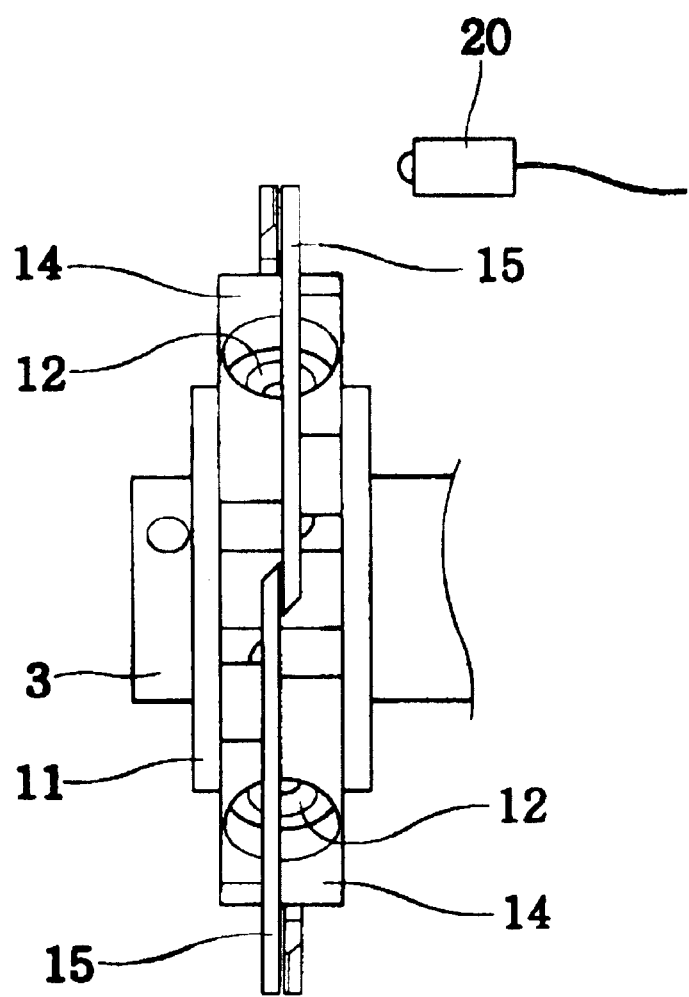
FIG. 5 is a side view of the rotation sensing device as shown in FIG. 4.

FIG. 2 is a perspective view of a fan apparatus adapted to a chamber according to the present invention; FIG. 3 is an exploded perspective view of a rotation sensing device as shown in FIG. 2; FIG. 4 is an assembly view of the rotation sensing device as shown in FIG. 2; FIG. 5 is a side view of the rotation sensing device as shown in FIG. 4. As illustrated therein, the rotation sensing device includes: a sensor dog 10 being installed at the outer circumferential surface of a shaft 3 installed inside a case 4 and being configured to be spread to a length larger than the diameter in the stop state when a centrifugal force is generated by the rotation of the shaft 3; an optical sensor 20 receiving light reflected from the surface of the sensor dog and producing a sensing signal of the light if the sensor dog 10 is spread the predetermined length by scanning the light to the sensor dog 10; and a main controller 100 judging that the fan apparatus is rotated upon receipt of the sensing signal of the light from the optical sensor 20.

The construction and operation of the present invention will now be described in more detail.

The fan apparatus, to which the rotation sensing device of the present invention is adapted, mainly includes a rotary motor 1, a coupling 2, a shaft 3, a case 4, a plurality of bearing housings 5, a sensor dog 10, and an optical sensor 20. The rotation sensing device includes a sensor dog 10, an optical sensor 20 and a controller 100.

The rotary motor 1 of the fan apparatus, to which the rotary sensing device of the present invention is adapted, transfers a generated rotation force to a rotary central axis 1a, and the shaft 3 is connected to the rotary central axis 1a having received the rotation force by using the coupling 3. The shaft 3 is installed inside the case 4, and grease is filled inside the case 4 in a state the bearing housing 5 is installed at both ends of the case 4. A sensor brake 6 is installed at one end of the housing 5 installed at the case 4 filled with the grease and the sensor dog 10 is installed at the shaft 3. Thus, when the shaft 3 is stopped, the sensor brake 6 stops the rotation of the shaft 3 by stopping the sensor dog 10.

To receive reflected light after scanning light to the sensor dog 10 for stopping the rotation of the shaft 3, the optical sensor 20 is installed at the case 4. The sensor dog 10 includes a fixing member 11, a plurality of guide shafts 12, a plurality of elastic members 13, a plurality of moving blocks 14 and a plurality of dog members 15.

The fixing member 11 of the sensor dog 10 is formed in a cylindrical shape and is fixed at one end of the shaft 3. The plurality of moving blocks 14 are arranged in at least four directions on the outer circumferential surface of the fixing member 11 fixed at one end of the shaft 3, and the dog member 15 is fixed at each of the plurality of moving blocks. Each of the moving blocks 14 at which the dog member 15 is installed are fixed to the fixing member 11 by the guide shaft 12.

The elastic member 13 is inserted into the outer circumferential surface of the fixing member 11 before the moving block 14 is fixed to the fixing member 11 by the guide shaft 12. The other end of the thusly inserted elastic member 13 is fixed to the outer circumferential surface of the guide shaft 12, and one end of the elastic member 13 is fixed to the moving block 14.

The sensor dog 10, which is configured in such a manner that the moving blocks 14 and the dog members 15 are installed at the fixing member 11 fixed at one end of the shaft 3 by the guide shaft 12, is spread a predetermined length larger than the diameter of the shaft of the stop state when a centrifugal force is generated by the rotation of the shaft 3. The optical sensor 20 scans light to the sensor dog 10 spread the predetermined length larger than the diameter of the shaft 3 of the stop state by the rotation of the shaft 3.

In a case that the sensor dog 10 is spread the predetermined length by the centrifugal force. The light scanned from the optical sensor 20 is reflected from the sensor dog 10. The optical sensor 20 receives the light reflected from the sensor dog 10 and then the optical sensor 20 converts the light reflected from the sensor dog 10 into an electric signal and transfers it to the main controller 100. The main controller 100 receives the electric signal transferred from the optical sensor 20 and judges whether the fan apparatus is rotated or not.

The operation of sensing whether the shaft 3 is rotated or not by the rotation sensing apparatus provided with the sensor dog 10 and the optical sensor 20 will now be described in more detail with reference to the accompanying drawings.

Figure 6A:
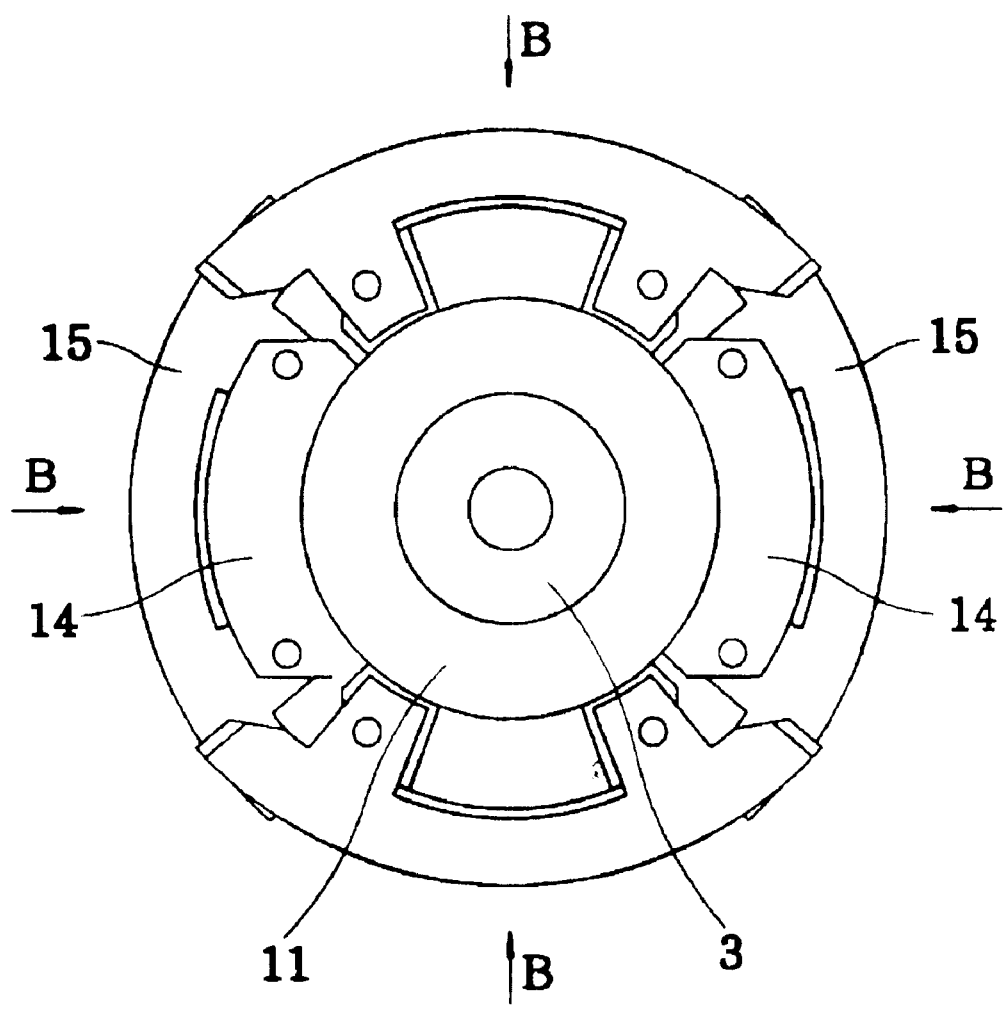
FIGS. 6a and 6b are views illustrating the stop state of a sensor dog as shown in FIG. 2.
Figure 6B:
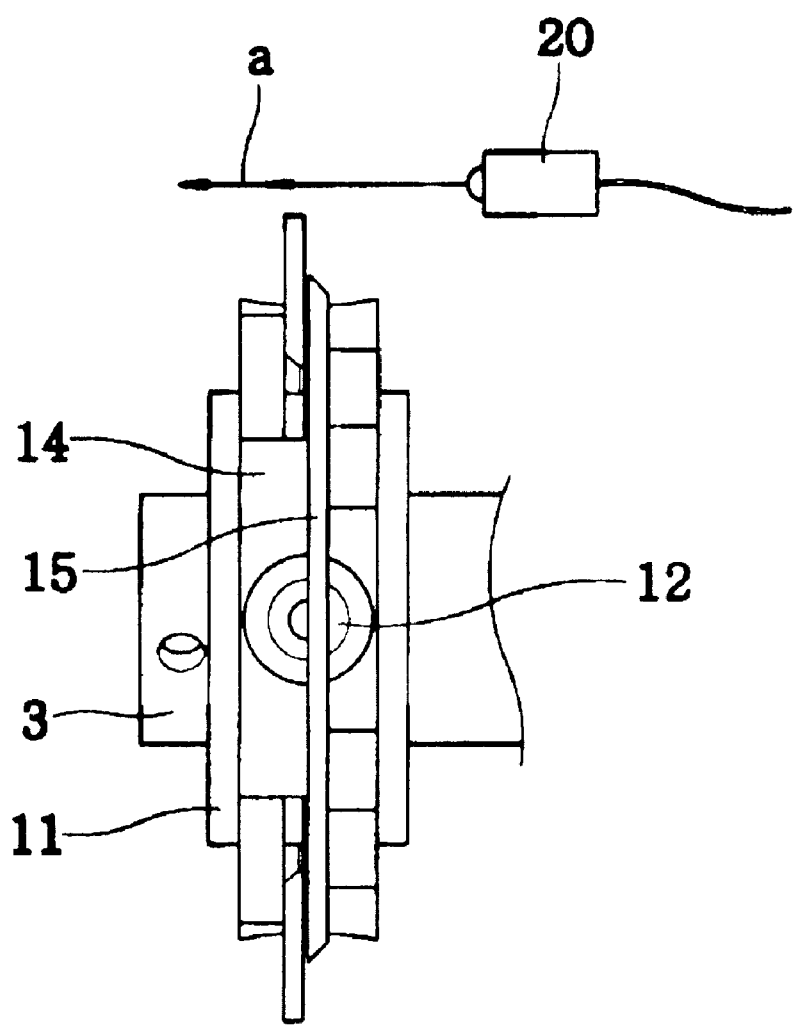

FIGS. 6a and 6b illustrate the compressed state of the elastic member 13 of the sensor dog 10 when the shaft 3 is in the stop state. That is, as illustrated in FIG. 6, when the shaft 3 is in the stop state, the moving block 14 and dog member 15 of the sensor dog 10 are compressed in the direction of arrow B. At this time, when the optical sensor 20 scans light in the direction of arrow A, the scanned light passes directly over the dog member 15 of the sensor dog 10 and thusly the light cannot be received by the optical sensor 20.

Figure 7A:
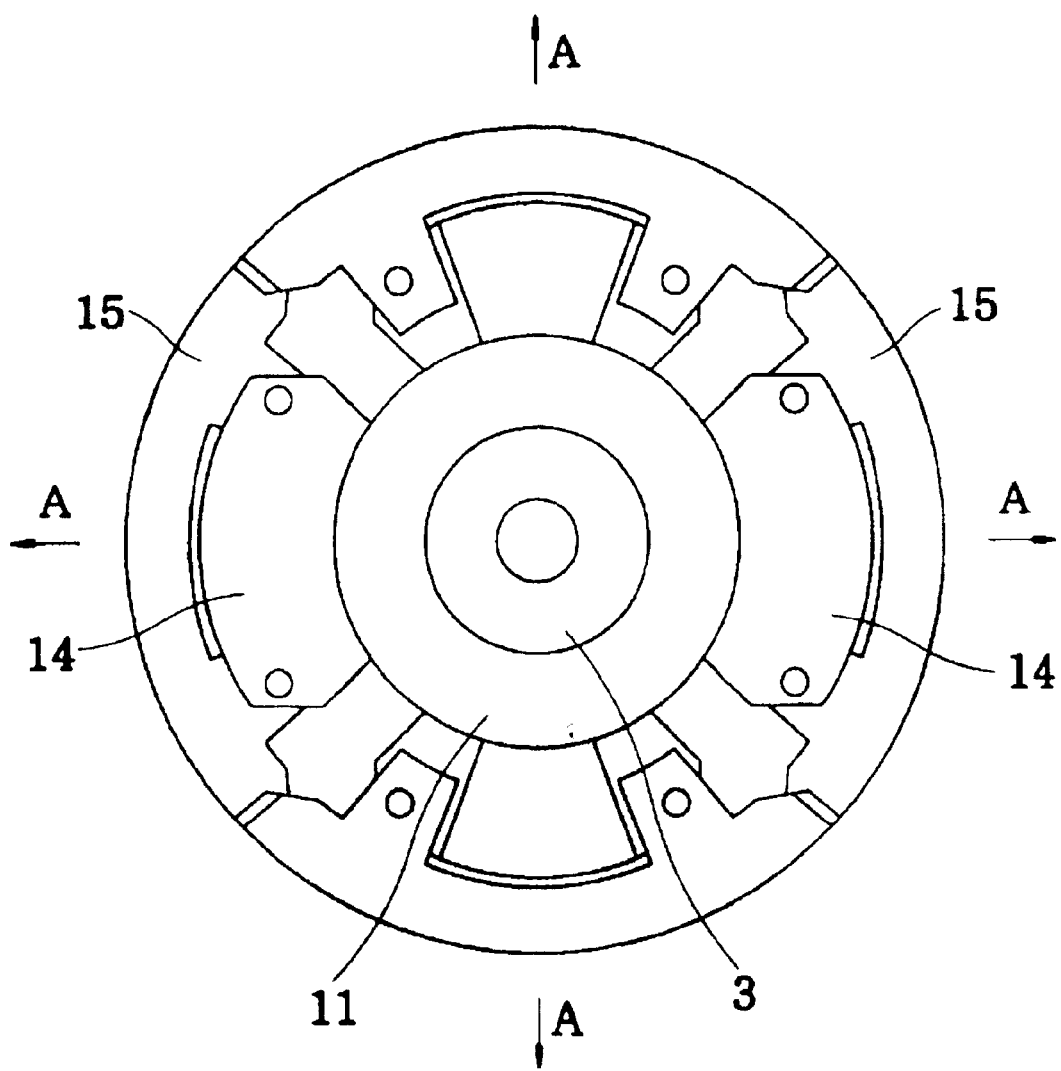
FIGS. 7a and 7b are views illustrating the rotation state of the sensor dog as shown in FIG. 2.
Figure 7B:
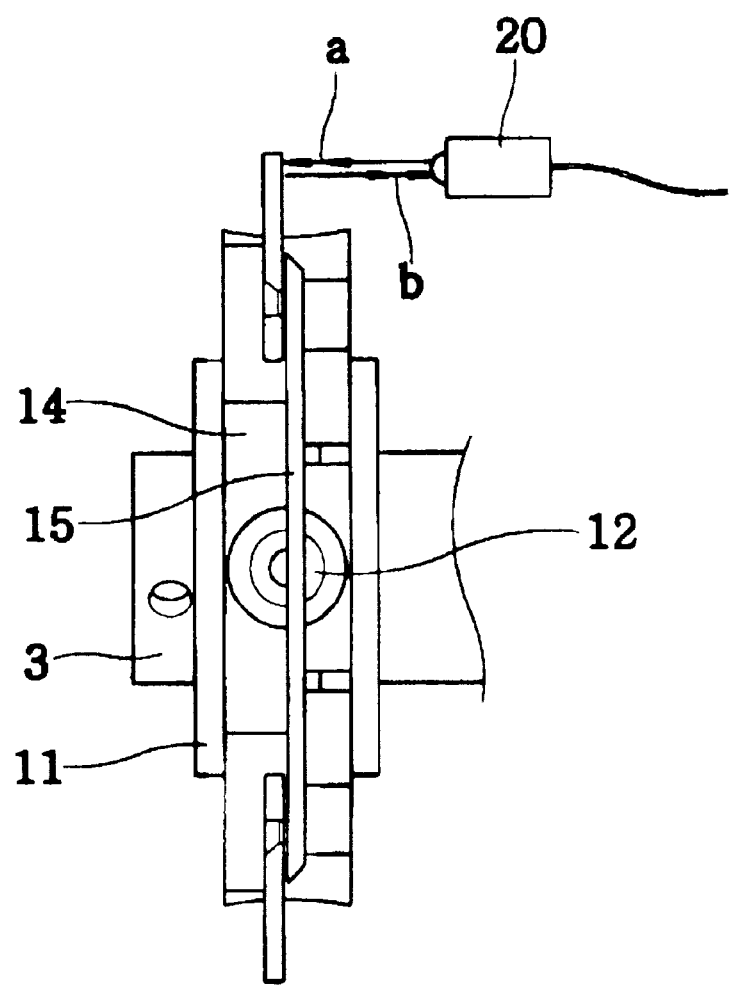

FIGS. 7a and 7b illustrates the state that the shaft 3 is rotated which is the reverse to the state of the sensor dog 10 as shown in FIGS. 6a and 6b. With respect to the sensor dog 10 as shown in FIG. 7a, a centrifugal force is generated to the sensor dog 10 by the rotation of the shaft 3. If this centrifugal force becomes larger than the compression force of the elastic member 13, the moving block 14 and the dog member 15 are spread in the direction of arrow B. In a case that the moving block 14 and the dog member 15 are spread in the direction of arrow B, the dog member 15 is extended and spread a predetermined length to the outside from the central axis of the shaft 3.

When the dog member 15 is extended at the predetermined length, as illustrated in FIG. 7b, the light scanned in the direction of arrow A From the optical sensor 20 is reflected on the surface of the dog member 15 in the direction of arrow B and the reflected light is received by the optical sensor 20. The optical sensor having received the light converts the received light into an electric signal to produce a sensing signal and transfers it to the main controller 100. The optical sensor 20 producing the sensing signal and transferring it to the main controller 100 is installed inside a module case 21 with a light emitting device 22 and a light receiving device 23 built therein.

As the light emitting device 22 built in the module case 21, a light emitting diode or a semiconductor laser diode is used in order to generate a light having a predetermined wavelength and to scan the light to the surface of the dog member 15 of the sensor dog 10.

As the light receiving device 23 receiving the light emitted from the light emitting device 22 to which the light emitting diode or semiconductor laser diode is adapted, a photo diode or photo transistor is used in order to receive the light reflected from the surface of the dog member 15 of the sensor dog 10.

When the optical sensor 20 including the light emitting device 22 and the light receiving device 23 generates light and scans it to the surface of the dog member 15, and then receives the light reflected from the surface of the dog member 15 at the rotation of the shaft 3, the main controller 100 receives the sensing signal converted into the electric signal and judges the rotation state of the fan apparatus according to whether the sensing signal is received or not. That is, if the sensing signal is received from the optical sensor 20, it is judged that the fan apparatus is rotated. On the contrary, if the sensing signal is not received, it is judged that the fan apparatus is not rotated.

In this way, the present invention can directly sense whether the fan apparatus is rotated or not regardless of the ambient temperature of the fan apparatus by sensing whether the fan apparatus controlling the temperature of the chamber in the handler is rotated or not by using the sensor dog and the optical sensor.

As described above, the present invention provides an effect of directly sensing whether the fan apparatus is rotated or not regardless of the ambient temperature of the fan apparatus by sensing whether the fan apparatus controlling the temperature of the chamber in the handler is rotated or not by using the sensor dog and the optical sensor.

What is claimed is:

1. A rotation sensing device of a fan apparatus adapted to a chamber of a handler comprising:

a sensor dog being installed at the outer circumferential surface of a shaft installed inside a case and being configured to be spread a predetermined length larger than the diameter of the stop state when a centrifugal force is generated by the rotation of the shaft;

an optical sensor receiving light reflected from the surface of the sensor dog and producing a sensing signal of the light if the sensor dog is spread the predetermined length by scanning the light to the sensor dog; and a main controller judging that the fan apparatus is rotated upon receipt of the sensing signal of the light from the optical sensor.

2. The rotation sensing device of claim 1, the sensor dog comprises:

a plurality of fixing members installed fixedly at the outer circumferential surface of the shaft of the fan apparatus and having coupling grooves formed with a predetermined distance and a predetermined direction;

a plurality of guide shafts installed fixedly at the coupling grooves and having elastic members formed on at one end thereof;

a plurality of moving blocks inserted and installed to the guide shafts in order to be linked to the elastic members and for moving a predetermined distance along the guide shafts when a centrifugal force is generated by the rotation of the shaft; and a plurality of dog members installed to the moving blocks and spread with a predetermined distance by the movement of the moving blocks.

3. The rotation sensing device of claim 1, wherein the optical sensor comprises:

a light emitting device for generating light with a predetermined wavelength and scanning it to the sensor dog; and a light receiving device for receiving the light scanned to the sensor dog and transmitting it to the main controller.

4. The rotation sensing device of claim 3, wherein the light emitting device is a light emitting diode or a semiconductor diode.

5. The rotation sensing device of claim 3, wherein the light receiving device is a photodiode or a phototransistor.

* * * * *